US012602619B2

(12) United States Patent
Ishikawa et al.

(10) Patent No.: US 12,602,619 B2
(45) Date of Patent: Apr. 14, 2026

(54) MACHINE LEARNING SYSTEM AND MACHINE LEARNING METHOD

(71) Applicant: Hitachi High-Tech Corporation, Tokyo (JP)

(72) Inventors: Masayoshi Ishikawa, Tokyo (JP); Daisuke Asai, Tokyo (JP); Yuichi Abe, Tokyo (JP); Yohei Minekawa, Tokyo (JP); Mitsuji Ikeda, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 753 days.

(21) Appl. No.: 18/084,920

(22) Filed: Dec. 20, 2022

(65) Prior Publication Data

US 2023/0229965 A1 Jul. 20, 2023

(30) Foreign Application Priority Data

Jan. 17, 2022 (JP) ................................. 2022-004834

(51) Int. Cl.
*G06N 20/00* (2019.01)

(52) U.S. Cl.
CPC .................................... *G06N 20/00* (2019.01)

(58) Field of Classification Search
CPC .... G06N 20/00; G06N 3/0464; G06N 3/0895; G06N 3/096; G06N 3/045
See application file for complete search history.

(56) References Cited

U.S. PATENT DOCUMENTS

| | | | | |
|---|---|---|---|---|
| 2019/0354850 A1* | 11/2019 | Watson | ................. | G06N 3/045 |
| 2020/0134469 A1* | 4/2020 | Choo | ..................... | G06N 3/045 |
| 2021/0089921 A1* | 3/2021 | Aghdasi | .................. | G06N 5/04 |

(Continued)

FOREIGN PATENT DOCUMENTS

| | | |
|---|---|---|
| JP | 2016-191975 A | 11/2016 |
| JP | 2021-193280 A | 12/2021 |
| JP | 2023-074114 A | 5/2023 |

OTHER PUBLICATIONS

You, "LogME: Practical Assessment of Pre-trained Models for Transfer Learning", 2021. (Year: 2021).*

(Continued)

*Primary Examiner* — Dave Misir
(74) *Attorney, Agent, or Firm* — Volpe Koenig

(57) ABSTRACT

A machine learning system and a machine learning method capable of selecting a pretrained model to be used in transfer learning in a short time without actually executing the transfer learning includes a pretrained model acquisition unit which acquires a pretrained model from a pretrained model storage unit storing a plurality of pretrained models obtained by learning a transfer source task under respective conditions; a transfer learning dataset storage unit configured to store dataset related to a transfer target task; a pretrained model adaptability evaluation unit configured to evaluate adaptability of each pretrained model acquired by the pretrained model acquisition unit to the dataset related to the transfer target task; and a transfer learning unit configured to execute, based on an evaluation result of the pretrained model adaptability evaluation unit, transfer learning using a selected pretrained model and the dataset, and outputs a learning result as a trained model.

15 Claims, 8 Drawing Sheets

(56)         References Cited

U.S. PATENT DOCUMENTS

| | | | |
|---|---|---|---|
| 2021/0383215 A1* | 12/2021 | Nakabayashi | G06N 3/08 |
| 2022/0067428 A1* | 3/2022 | Limasanches | G06N 20/00 |
| 2023/0152759 A1 | 5/2023 | Kotera et al. | |
| 2023/0206428 A1* | 6/2023 | Liu | G06T 7/0012 |
| | | | 382/128 |
| 2023/0281967 A1* | 9/2023 | Watanabe | G06V 10/766 |
| | | | 382/159 |

OTHER PUBLICATIONS

Japanese Office Action issued on Apr. 1, 2025 for Japanese Patent Application No. 2022-004834.

* cited by examiner

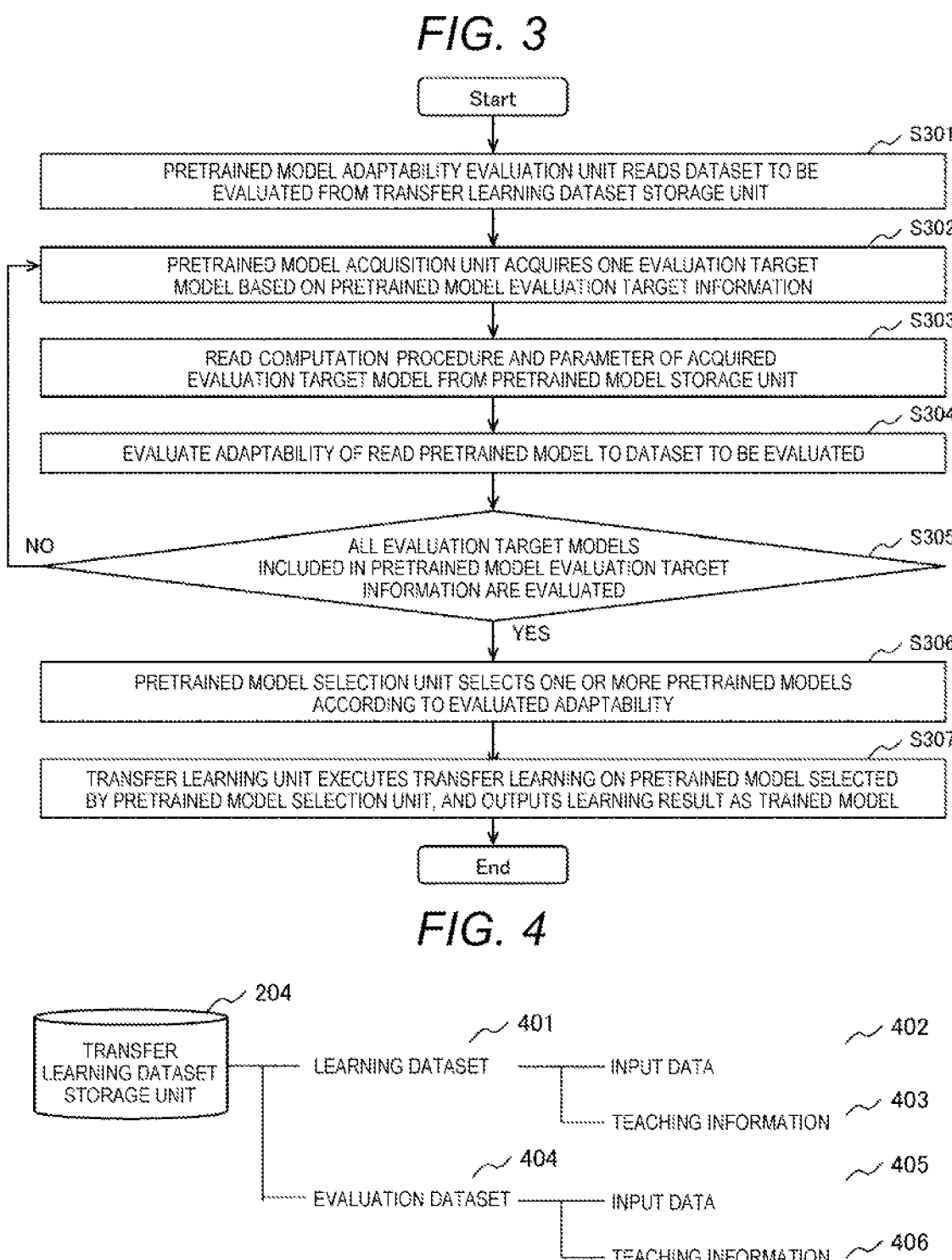

Start

PRETRAINED MODEL ADAPTABILITY EVALUATION UNIT READS DATASET TO BE EVALUATED FROM TRANSFER LEARNING DATASET STORAGE UNIT ⟋ S301

PRETRAINED MODEL ACQUISITION UNIT ACQUIRES ONE EVALUATION TARGET MODEL BASED ON PRETRAINED MODEL EVALUATION TARGET INFORMATION ⟋ S302

READ COMPUTATION PROCEDURE AND PARAMETER OF ACQUIRED EVALUATION TARGET MODEL FROM PRETRAINED MODEL STORAGE UNIT ⟋ S303

EVALUATE ADAPTABILITY OF READ PRETRAINED MODEL TO DATASET TO BE EVALUATED ⟋ S304

NO      ALL EVALUATION TARGET MODELS INCLUDED IN PRETRAINED MODEL EVALUATION TARGET INFORMATION ARE EVALUATED ⟋ S305

YES

PRETRAINED MODEL SELECTION UNIT SELECTS ONE OR MORE PRETRAINED MODELS ACCORDING TO EVALUATED ADAPTABILITY ⟋ S306

TRANSFER LEARNING UNIT EXECUTES TRANSFER LEARNING ON PRETRAINED MODEL SELECTED BY PRETRAINED MODEL SELECTION UNIT, AND OUTPUTS LEARNING RESULT AS TRAINED MODEL ⟋ S307

End

*FIG. 4*

TRANSFER LEARNING DATASET STORAGE UNIT ⟋ 204

LEARNING DATASET ⟋ 401

INPUT DATA ⟋ 402

TEACHING INFORMATION ⟋ 403

EVALUATION DATASET ⟋ 404

INPUT DATA ⟋ 405

TEACHING INFORMATION ⟋ 406

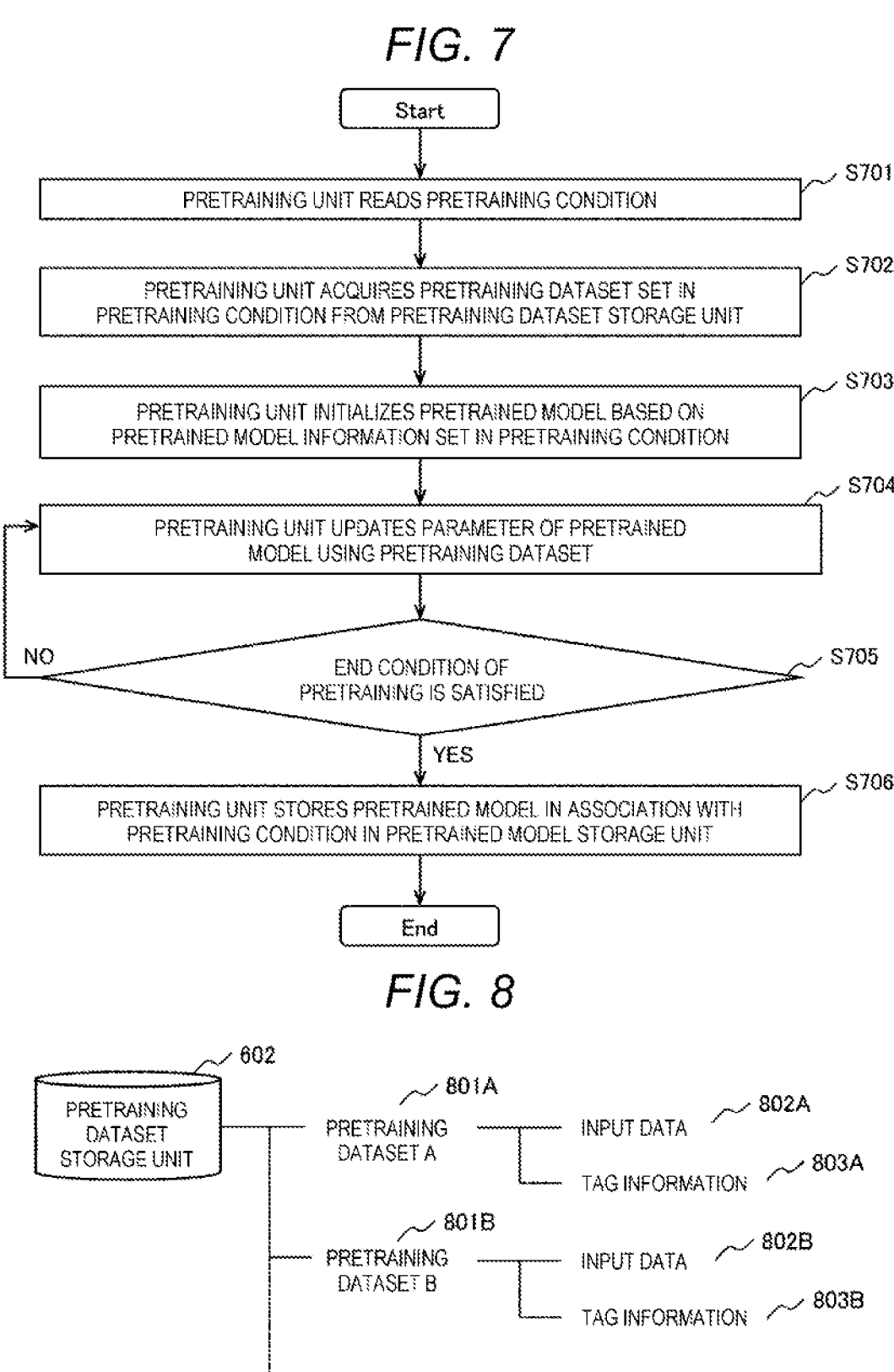

FIG. 7

Start

PRETRAINING UNIT READS PRETRAINING CONDITION — S701

PRETRAINING UNIT ACQUIRES PRETRAINING DATASET SET IN PRETRAINING CONDITION FROM PRETRAINING DATASET STORAGE UNIT — S702

PRETRAINING UNIT INITIALIZES PRETRAINED MODEL BASED ON PRETRAINED MODEL INFORMATION SET IN PRETRAINING CONDITION — S703

PRETRAINING UNIT UPDATES PARAMETER OF PRETRAINED MODEL USING PRETRAINING DATASET — S704

END CONDITION OF PRETRAINING IS SATISFIED — S705
NO
YES

PRETRAINING UNIT STORES PRETRAINED MODEL IN ASSOCIATION WITH PRETRAINING CONDITION IN PRETRAINED MODEL STORAGE UNIT — S706

End

FIG. 8

PRETRAINING DATASET STORAGE UNIT — 602

PRETRAINING DATASET A — 801A
INPUT DATA — 802A
TAG INFORMATION — 803A

PRETRAINING DATASET B — 801B
INPUT DATA — 802B
TAG INFORMATION — 803B

PRETRAINING PARAMETER SETTING UNIT

| Parameters | Input |
|---|---|
| Architecture type | Architecture 1 |
| Number of classes | 64 |
| Embedding dimensions | 512 |
| Batch size | 256 |
| Learning rate schedule | 0.1 |
| ... | |

DATASET FILTER    ~ 1102

| Domain 1   × | Condition 1   × |
|---|---|

DATASET SELECTION UNIT    ~ 1103

| # | Use | Dataset Name |
|---|---|---|
| 1 | ☒ | Dataset 1 |
| 2 | | Dataset 2 |
| 3 | ☒ | Dataset 3 |
| ... | | |

~ 1104

START TRAINING

TRANSFER LEARNING DATA SELECTION UNIT

~ 1202

TRANSFER LEARNING DATASET TAG

| Dataset 4 | Domain 1  × | Condition 1  × |

PRETRAINED MODEL DISPLAY SELECTION UNIT  ~ 1203

| # | SELECTION | MODEL NAME | ARCHITECTURE | PRETRAINING DATASET | TAG | ADAPTABILITY | EVALUATION INDEX |
|---|-----------|-----------|-------------|--------------------|-----|-------------|-----------------|
| 1 | ✓ | Model 1 | Arch. 1 | Dataset 3 | Domain 1 × / Condition 1 × | – | – |
| 2 |   | Model 2 | Arch. 1 | Dataset 1, Dataset 2 | Domain 1 × / Condition 1 × | 13.8 | 0.93 |
| ... |   |   |   |   |   |   |   |

~ 1204
START ADAPTABILITY EVALUATION

~ 1205
SET TRANSFER LEARNING CONDITION

~ 1206
START TRANSFER LEARNING

FIG. 13

PRETRAINED MODEL DISPLAY UNIT: Model 1  ~ 1301

DATASET DISPLAY UNIT: Dataset 4  ~ 1302

ADAPTABILITY DISPLAY UNIT: 12.3  ~ 1303

~ 1304
TEACHING INFORMATION DISPLAY UNIT

~ 1305
PRETRAINED MODEL IMAGE SEGMENTATION RESULT DISPLAY UNIT

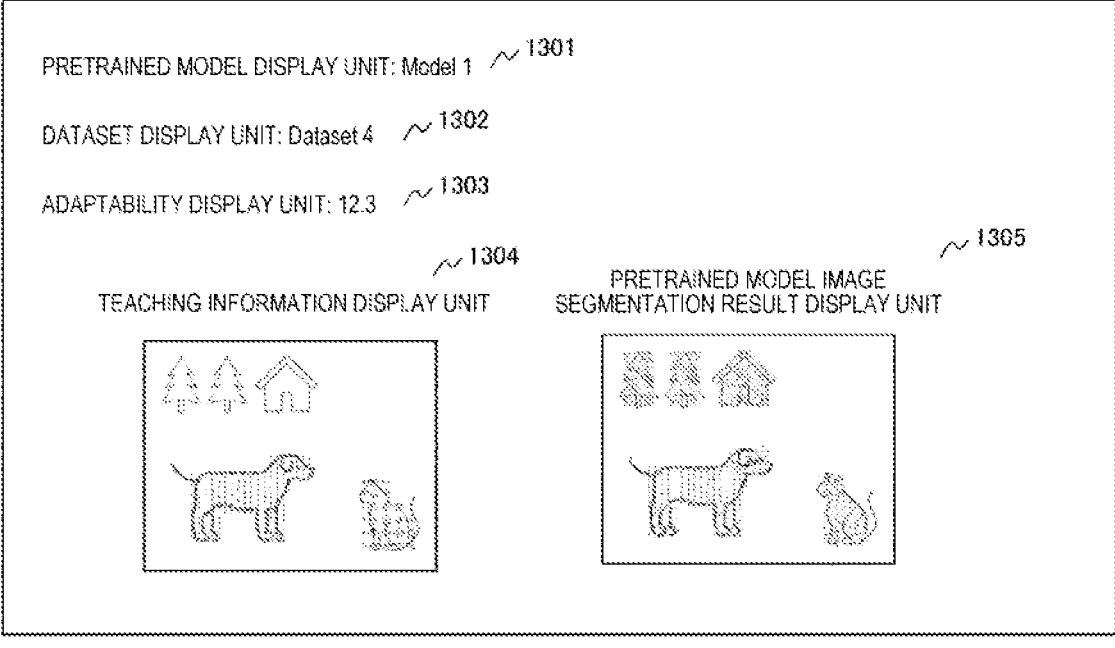

MACHINE LEARNING SYSTEM AND MACHINE LEARNING METHOD

CLAIM OF PRIORITY

The present application claims priority from Japanese Patent application serial no. 2022-4834, filed on Jan. 17, 2022, the content of which is hereby incorporated by reference into this application.

BACKGROUND OF THE INVENTION

1. Field of the Invention

The present invention relates to a machine learning system and a machine learning method.

2. Description of Related Art

In a machine learning technique of executing data processing, in particular, in a multilayer neural network called deep learning, an approach called transfer learning which uses a past pretrained model and past training data to improve performance on a new dataset is frequently used. For example, JP2016-191975A describes that, in order to efficiently execute transfer learning, it is evaluated whether data used in pretraining is effective for the transfer learning after the transfer learning is executed.

SUMMARY OF THE INVENTION

In a technique described in JP2016-191975A, effectiveness of transfer learning is evaluated after the transfer learning is actually executed. However, when a combination of a dataset and a model architecture used in the transfer learning is enormous, it takes time to execute the transfer learning on all the pretrained models. According in the technique described in JP2016-191975A, a long time may be required until a new machine learning model is acquired by the transfer learning.

An object of the invention is to provide a machine learning system and a machine learning method capable of selecting a pretrained model to be used in transfer learning in a short time without actually executing the transfer learning.

In order to solve the above problem, the machine learning system according to the invention includes: a pretrained model acquisition unit configured to acquire at least one pretrained model from a pretrained model storage unit storing a plurality of pretrained models obtained by learning a transfer source task under respective conditions; a transfer learning dataset storage unit configured to store a dataset related to a transfer target task; a pretrained model adaptability evaluation unit configured to evaluate adaptability of each pretrained model acquired by the pretrained model acquisition unit to the dataset related to the transfer target task; and a transfer learning unit configured to execute, based on an evaluation result of the pretrained model adaptability evaluation unit, transfer learning using a selected pretrained model and the dataset, and outputs a learning result as a trained model.

The machine learning method includes: acquiring a pretrained model obtained by learning a transfer source task; reading a dataset related to a transfer target task; evaluating adaptability of the pretrained model to the dataset related to the transfer target task; and executing, based on an evaluation result, transfer learning using the pretrained model and the dataset and outputting a learning result as a trained model.

According to the invention, it is possible to provide a machine learning system and a machine learning method capable of selecting a pretrained model to be used in transfer learning in a short time without actually executing the transfer learning.

Problems, configurations and effects other than those described above will be clarified by the following descriptions of embodiments.

BRIEF DESCRIPTION OF THE DRAWINGS

FIG. 1 is a diagram illustrating an outline of a method of selecting a pretrained model;

FIG. 3 is a flowchart illustrating an operation of the machine learning system according to the first embodiment of the invention;

FIG. 4 is a diagram illustrating a configuration example of a transfer learning dataset storage unit;

FIG. 7 is a flowchart illustrating pretraining processing;

FIG. 8 is a diagram illustrating a configuration example of a pretraining dataset storage unit;

FIG. 11 is an example of a pretraining setting screen;

FIG. 12 is an example of an adaptability evaluation and transfer learning setting screen; and FIG. 13 is an example of an adaptability evaluation result check screen.

DESCRIPTION OF EMBODIMENTS

Figure 2:
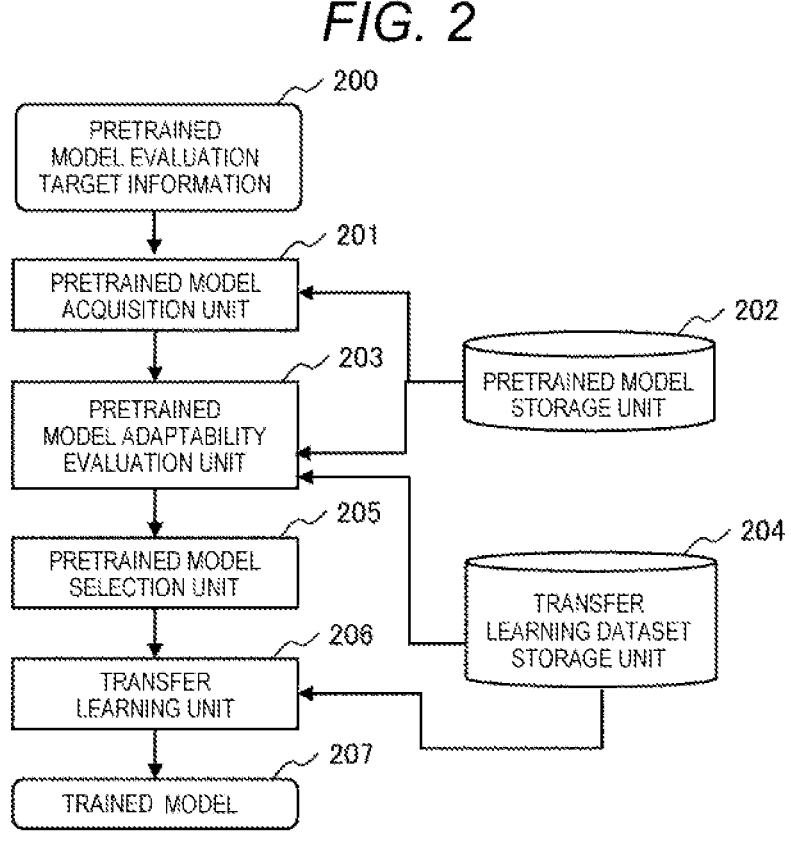
FIG. 2 is a diagram illustrating a configuration example of a machine learning system according to a first embodiment of the invention.

Hereinafter, embodiments of the invention will be described with reference to the drawings. The detailed description of the repeated portions will be omitted.

Figure 1:
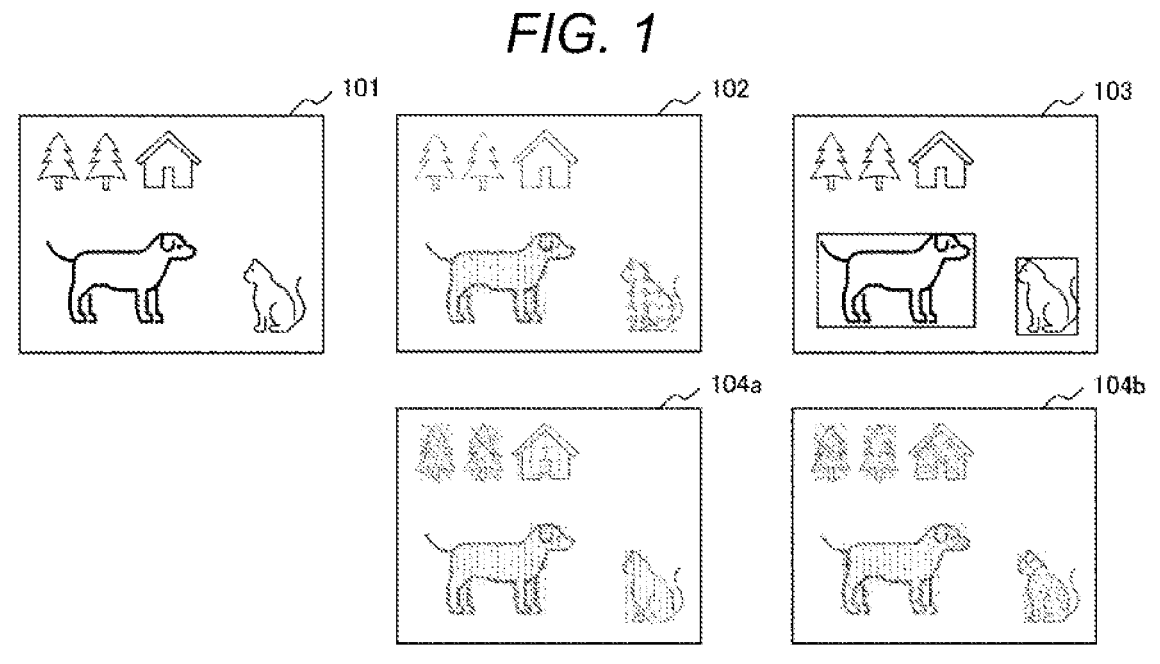

First, an outline of a method of selecting a pretrained model according to the present embodiment will be described with reference to FIG. 1. In the present specification, a task to be subjected to transfer learning by supervised learning is referred to as a transfer target task or a downstream task, and a task to be subjected to learning of a pretraining model used in the transfer learning is referred to as a transfer source task or a pretraining task. In the present specification, supervised information may be referred to as teaching information.

In the downstream task, an input image 101 a segmentation label 102 and/or a detection label 103 are provided. Here, one of the segmentation label 102 and the detection label 103 may be used alone. The segmentation label 102 is provided with information indicating to which class or instance each pixel belongs. Here, segmentation is recognition processing called semantic segmentation, instance segmentation, or panoptic segmentation. The detection label 103 is provided with information indicating an area to which a detection target class belongs and a detection class in the input image 101. In the transfer learning using the downstream task, a model that takes the input image 101 as an input and outputs the segmentation label 102 or the detection label 103 is learned.

Image segmentation results 104a and 104b are image segmentation results obtained by the pretrained model, and are obtained by different pretrained models A and B, respectively. A difference in texture indicates that the image is segmented into different areas. That is, in the image segmentation result 104a, a dog and a cat are segmented as areas belonging to the same class, but trees and a house are segmented as areas belonging to different classes. On the other hand, in the image segmentation result 104b, the trees and the house are segmented as areas belonging to the same class, but the dog and the cat are segmented as areas belonging to different classes, and further, heads and bodies of the dog and the cat are segmented as different classes. Here, the image segmentation result by the pretrained model is a result obtained by segmenting the input data into a plurality of areas such that the input data has the same meaning in the same area, as in a segmentation task.

In a machine learning system according to the present embodiment, the pretrained model including a function of executing such image segmentation is learned using the pretraining task.

By comparing such image segmentation results 104a and 104b with the segmentation label 102 and the detection label 103, it is possible to select a pretrained model suitable for the downstream task. For example, the segmentation label 102 is a task of recognizing the dog and the cat as different classes. In the case of this task, the pretrained model B, which outputs the image segmentation result 104b in which the dog and the cat are segmented as different classes, is more suitable for the transfer learning than the pretrained model A, which outputs the image segmentation result 104a in which the dog and the cat are segmented as the same class. Similarly, for the detection label 103, in the case of the task in which the dog and the cat are detected as different classes, the pretrained model B, which outputs the image segmentation result 104b in which the dog and the cat are different classes, is more suitable for the transfer learning.

As described above, in the present embodiment by evaluating adaptability between the image segmentation result by each pretrained model including the function of executing the image segmentation and the teaching information of the downstream task, it is possible to select a pretrained model effective for the transfer learning in a short time without actually executing the transfer learning.

The pretrained model according to the present embodiment includes a function of outputting a feature for each position of the input data in addition to the function of executing the image segmentation, and outputs a similar feature in an area estimated to have the same meaning. Therefore, the pretrained model having higher relevance (similarity) between the image segmentation results 104a and 104b and the teaching information such as the segmentation label 102 and the detection label 103 learns different features for each provided teaching information, has a higher capability of identifying the provided teaching information, and is considered to be a model suitable for the transfer learning.

First Embodiment

An example of the machine learning system that implements the method of selecting the pretrained model illustrated in FIG. 1 will be described. FIG. 2 is a diagram illustrating a configuration example of the machine learning system according to a first embodiment of the invention, and FIG. 3 is a flowchart illustrating an operation of the machine learning system according to the first embodiment of the invention.

As illustrated in FIG. 2, the machine learning system according to the present embodiment includes a pretrained model storage unit 202, a pretrained model acquisition unit 201, a transfer learning dataset storage unit 204, a pretrained model adaptability evaluation unit 203, a pretrained model selection unit 205, and a transfer learning unit 206. The pretrained model storage unit 202 stores a plurality of pretrained models obtained by learning the pretraining task. The pretrained model acquisition unit 201 acquires at least one pretrained model from the pretrained model storage unit 202. The transfer learning dataset storage unit 204 stores a dataset related to the downstream task. The pretrained model adaptability evaluation unit 203 evaluates the adaptability of each pretrained model acquired by the pretrained model acquisition unit 201 to the dataset related to the downstream task. The pretrained model to be evaluated by the pretrained model adaptability evaluation unit 203 is determined based on pretrained model evaluation target information 200. The pretrained model selection unit 205 selects, based on an evaluation result of the pretrained model adaptability evaluation unit 203, a pretrained model to be used in the transfer learning from the plurality of pretrained models stored in the pretrained model storage unit 202. The transfer learning unit 206 executes the transfer learning using the pretrained model selected by the pretrained model selection unit 205 and the dataset related to the downstream task stored in the transfer learning dataset storage unit 204, and outputs a learning result as a trained model 207.

Each unit in the machine learning system may be implemented by using hardware such as a circuit device on which the function of each unit is implemented, or may be implemented by an arithmetic device executing software on which the function is implemented.

Next, processing of the machine learning system according to the present embodiment will be described with reference to FIG. 3. A flow of this processing is executed at a timing at which the execution of the transfer learning is designated by an operator.

In step S301, the pretrained model adaptability evaluation unit 203 reads the dataset related to the downstream task to be subjected to the transfer learning from the transfer learning dataset storage unit 204.

FIG. 4 is a diagram illustrating a configuration example of the transfer learning dataset storage unit 204. As illustrated in FIG. 4, the dataset related to the downstream task stored in the transfer learning dataset storage unit 204 includes a learning dataset 401 for executing learning and an evaluation dataset 404 for executing performance evaluation. The learning dataset 401 includes input data 402 and teaching information 403, and the evaluation dataset 404 includes input data 405 and teaching information 406. Formats of these data are common to the learning dataset 401 and the evaluation dataset 404, but contents of the data are different. The input data 402 and 405 are, for example, image data such as the input image 101, and the teaching information 403 and 406 are, for example, the segmentation label 102 and the detection label 103.

In step S301, the pretrained model adaptability evaluation unit 203 reads the input data 402 and the teaching information 403 that are related to the learning dataset 401 from the transfer learning dataset storage unit 204.

In step S302, the pretrained model acquisition unit 201 acquires one evaluation target pretrained model based on the pretrained model evaluation target information 200. The pretrained model evaluation target information 200 stores information related to the evaluation target pretrained model. The evaluation target may be designated by the operator, or may be automatically designated by, for example, a condition related to the dataset used in the pretraining or a condition related to a configuration of the pretrained model.

In step S303, the pretrained model adaptability evaluation unit 203 reads a computation procedure and a parameter of the evaluation target pretrained model acquired in step S302 from the pretrained model storage unit 202. Here, in the case of a multilayer neural network, the computation procedure is information that includes a type and an order of a computation applied to the input data, and corresponds to, for example, a configuration, preprocessing, postprocessing, or the like of the neural network. The parameter is parameter used in the computation procedure, and is, for example, a learned weight parameter or hyperparameter of each layer of the neural network, or a parameter of the preprocessing and a parameter of the postprocessing.

Figure 5:
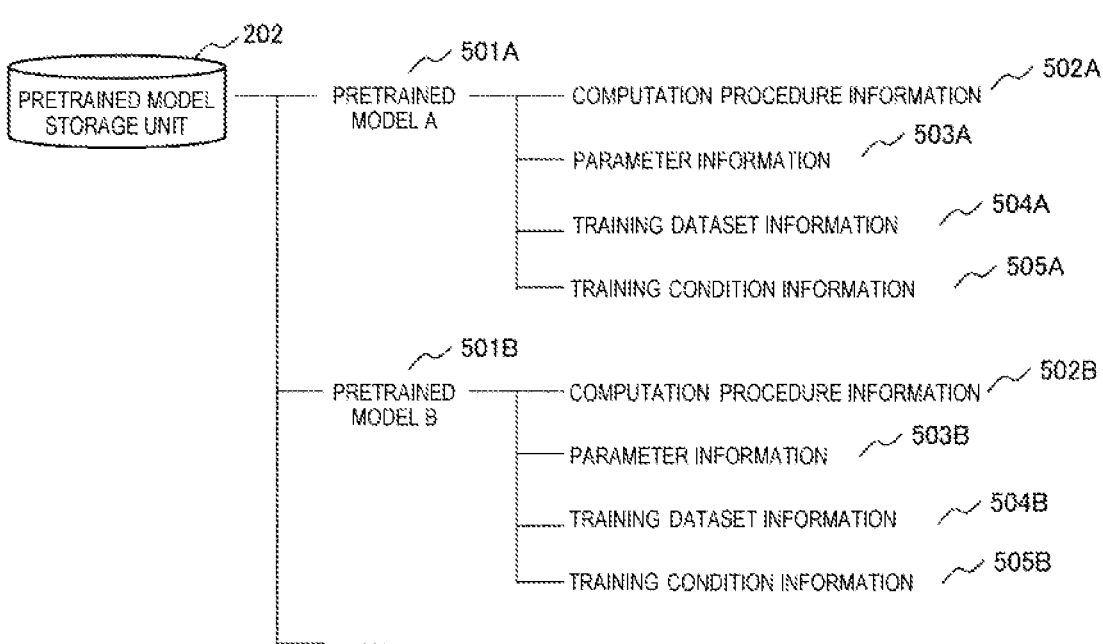
FIG. 5 is a diagram illustrating a configuration example of a pretrained model storage unit.

FIG. 5 is a diagram illustrating a configuration example of the pretrained model storage unit 202. As illustrated in FIG. 5, one or more pretrained models 501 (the pretrained model A, the pretrained model B, and the like) stored in the pretrained model storage unit 202 include computation procedure information 502, parameter information 503, training dataset information 504, and training condition information 505, respectively. The computation procedure information 502 and the parameter information 503 are the computation procedure and the parameter acquired by the pretrained model adaptability evaluation unit 203 in step S303. The training dataset information 504 stores information related to the dataset used in learning of the pretrained model 501, and is, for example, information for identifying the dataset or tag information such as a domain, an acquisition condition, and a class associated with the dataset. The training condition information 505 is information related to a training condition of the pretrained model 501, and is, for example, learning schedule information such as a learning period or information related to the hyperparameter in the learning. The training dataset information 504 and the training condition information 505 are prevented to the operator in order to determine the pretrained model evaluation target information 200.

In step S304, the pretrained model adaptability evaluation unit 203 evaluates the adaptability of the pretrained model read in step S303 to the dataset of the downstream task of the evaluation target read in step S301. The adaptability in the present embodiment is a degree of the adaptability of the image segmentation results 104a and 104b obtained by the pretrained model to the teaching information 403. A higher adaptability indicates that the pretrained model is more effective for the transfer learning.

A specific approach for evaluating the adaptability will be described. Here, an assignment cost is expressed as $C_{ij}$ in the case in which an assignment by the image segmentation by the pretrained model is an i-th class and an assignment by the teaching information 403 is a j-th class. The adaptability can be expressed as a negative value obtained by multiplying a sum of the costs at the time of solving an assignment task of the image segmentation by the pretrained model and the teaching information by $-1$. This is because a higher adaptability is a better value, whereas the assignment task is generally formulated as minimizing the cost. The assignment task may be assigned in a one-to-one manner, or may be assigned in a many-to-one manner when the number of image segmentations by the pretrained model is larger than the number of classes included in the teaching information.

As a method for computing the assignment cost $C_{ij}$, a plurality of approaches can be adopted. For example, an approach using a conditioned probability can be adopted. The conditioned probability that the assignment by the teaching information belongs to the class j when the assignment by the pretrained model belongs to the class i can be expressed as p(y=j|z=i). y is class information of the teaching information, and z is class information segmented by the pretrained model. In this case, the assignment cost can be computed as $C_{ij}=1-p(y=j|z=i)$. In addition to the conditioned probability, the assignment cost $C_{ij}$ can also be computed using a cross entropy, mutual information, or the like. By using these values, it is possible to evaluate the probability of correctly obtaining the class of the teaching information 403 when the class of the image segmentation by the pretrained model is determined.

An index called Intersection over Union (IoU) may be used to compute the assignment cost $C_{ij}$. IoU is a value obtained by dividing, by a union, an intersection of an image segmentation result by the pretrained model and an area provided by the teaching information. In this case, the assignment cost is obtained by $C_{ij}=1-IoU(y=j|z=i)$. A second term on a right side is a function for computing IoU between areas in which the area segmented by the pretrained model belongs to the class i and the teaching information belongs to the class j.

Similarity between the features may be used to compute the assignment cost $C_{ij}$. Specifically, the assignment cost $C_{ij}$ is obtained by adding, to the pretrained model, a function of outputting a feature for each area in addition to the function of executing image segmentation, and comparing averages of the features for each area of the class determined by the image segmentation result by the pretrained model and the teaching information. In this case, the assignment cost is obtained by $C_{ij}=D(G(f, y=j), G(f, z=i))$. G is a function for obtaining an average of features f for each area designated from the features f, and G(f, y=j) and G(f, z=i) are averages of the features f for each area in which the image segmentation result by the pretrained model and the teaching information belong to the class i and the class j, respectively. D is a function representing a distance between the features, and is a distance function such as a Euclidean distance or a cosine distance.

When the number of image segmentations by the pretrained model is larger than the number of classes included in the teaching information, the assignment task may be evaluated after applying clustering to the average feature for each image segmentation by the pretrained model to reduce the number of image segmentations by the pretrained model. When recognition of an instance is required instead of a class-by-class basis such as object detection, instance segmentation, or panoptic segmentation, the assignment task may be evaluated on an instance-by-instance basis instead of the class-by-class basis. When the teaching information is provided by a detection window as in the object detection, an area in the detection window may be handled as the area taught by the teaching information.

In step S305, the pretrained model adaptability evaluation unit 203 checks whether all the evaluation targets included in the pretrained model evaluation target information 200 are evaluated. If the evaluation is not completed, the processing returns to step S302 to continue the evaluation of the pretrained models that have not been evaluated, and if the evaluation of all the evaluation target pretrained models is completed, the processing proceeds to step S306.

In step S306, the pretrained model selection unit 205 selects one or more models having high adaptability to each pretrained model evaluated by the pretrained model adaptability evaluation unit 203. In the present embodiment, it is assumed that the pretrained model selection unit 205 automatically selects the model having the high adaptability, but the model may be selected by the operator as in a second embodiment described later.

In step S307, the transfer learning unit 206 executes the transfer learning on the pretrained model selected by the pretrained model selection unit 205 using the dataset stored in the transfer learning dataset storage unit 204, and outputs the learning result as the trained model 207.

According to the machine learning system according to the present embodiment, it is possible to select a pretrained model suitable for the dataset of the downstream task stored in the transfer learning dataset storage unit 204 from the pretrained models stored in the pretrained model storage unit 202 without actually executing the transfer learning. In particular, the pretrained model adaptability evaluation unit 203 according to the present embodiment only needs to forward propagate the input data of the downstream task to each pretrained model a number of times (for example, one time, at most 10 times per image) less than that at the time of the transfer learning. That is, according to the present embodiment, computation amount can be significantly reduced and the adaptability can be evaluated in a short time as compared with the case of actually executing transfer learning in which parameter updates by forward propagation and backward propagation are repeated many times for the pretrained model. When it is desired to further reduce the computation amount related to the evaluation of the effectiveness of the transfer learning, a part of the input data may be acquired by a method in consideration of deviation of the number of samples at random or for each class, instead of all the input data included in the dataset to be evaluated, and the evaluation of the pretrained model adaptability evaluation unit 203 may be executed using only a part of the input data.

Figure 6:
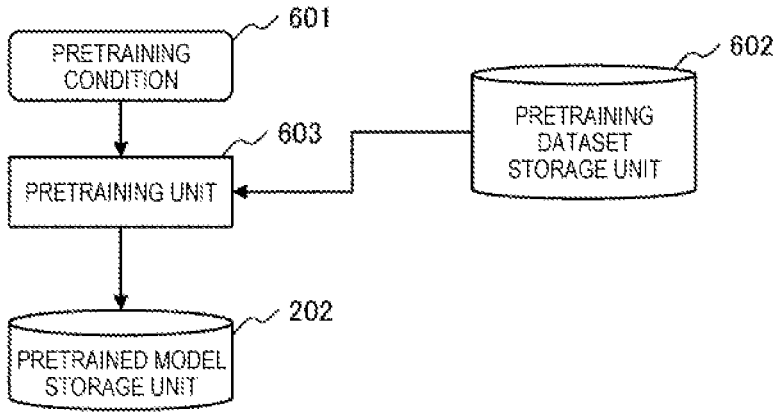
FIG. 6 is a diagram illustrating an outline of pretraining.

The pretraining executed in the present embodiment will be described with reference to FIGS. 6 and 7. FIG. 6 is a diagram illustrating an outline of the pretraining, and FIG. 7 is a flowchart illustrating processing of the pretraining.

First, in step S701, the pretraining unit 603 reads a pretraining condition 601. The pretraining condition 601 is information related to the pretraining condition, and includes information related to a pretraining dataset to be used, a computation procedure and a parameter condition of a model to be learned, and information related to a hyperparameter such as a learning schedule of the pretraining.

In step S702, the pretraining unit 603 acquires the pretraining dataset set in the pretraining condition 601 from a pretraining dataset storage unit 602. One or more pretraining datasets may be acquired.

Here, the pretraining dataset storage unit 602 will be described with reference to FIG. 8. FIG. 8 is a diagram illustrating a configuration example of the pretraining dataset storage unit 602. As illustrated in FIG. 8, the pretraining dataset storage unit 602 stores pretraining datasets 801A, 801B, and the like and one or more pretraining datasets 801. Each pretraining dataset 801 is associated with input data 802A and 802B and tag information 803A and 803B. The input data 802A and 802B are input data used in the pretraining task. In the pretraining according to the present embodiment, since self-supervised learning (unsupervised learning) is used, it is not necessary to have the teaching information for each pretraining dataset 801. Since the teaching information is not used, it is also possible to combine and use a plurality of pretraining datasets 801. The tag information 803A and 803B are tag information such as a domain, an acquisition condition, and a class associated with the dataset, and is information stored in the pretrained model storage unit 202 as the training dataset information 504.

In step S703, the pretraining unit 603 initializes the pretrained model based on the pretrained model information set in the pretraining condition 601. Specifically, random number initialization and the like are executed in accordance with the computation procedure and the parameter condition set in the pretraining condition 601.

In step S704, the pretraining unit 603 updates the parameter of the pretrained model initialized in step S703 using the pretraining dataset acquired in step S702. The parameter is updated by an optimization method such as stochastic gradient descent variants.

Figure 9:
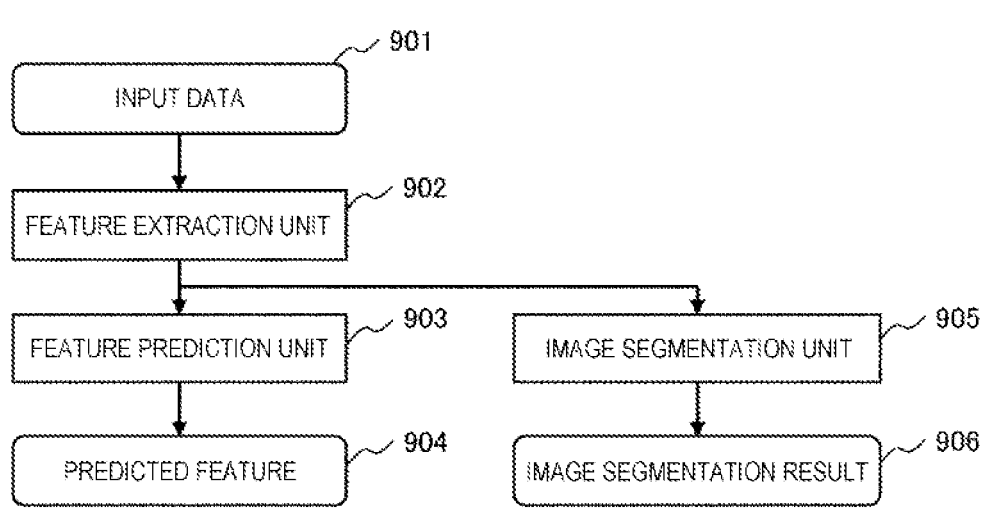
FIG. 9 is a diagram illustrating a configuration example of the pretrained model.

Here, the pretrained model will be described with reference to FIG. 9. FIG. 9 is a diagram illustrating a configuration example of the pretrained model. The pretrained model used in the present embodiment includes a feature extraction unit 902 that extracts a feature from input data 901, an image segmentation unit 905 that segments the input data 901 into a plurality of areas using the feature extracted by the feature extraction unit 902 such that the areas have the same meaning, and a feature prediction unit 903 that predicts a different feature for each area segmented by the image segmentation unit 905.

When the input data 901 is input to the pretrained model, the feature extraction unit 902 converts the input data 901 into a feature. The feature extraction unit 902 includes a neural network, and includes a configuration such as a multilayer perceptron, a convolutional neural network, an attention module, or a combination thereof. The feature prediction unit 903 and the image segmentation unit 905 also include the neural network. The feature prediction unit 903 outputs a predicted feature 904, and the image segmentation unit 905 outputs an image segmentation result 906.

In step S704 of the pretraining, learning is executed by a loss function that recommends that the predicted feature 904 has a different feature for each area segmented by the image segmentation unit 905. In this case, a learning method called contrastive learning may be combined to apply different noises to the input data, and the learning may be executed such that the same feature is obtained at points belonging to the same image segmentation class on the original image and the different features are obtained at points belonging to different image segmentation classes on the original image.

The image segmentation unit 905 learns the image segmentation using the loss function based on the clustering or the mutual information. When the clustering is used, the clustering is applied to an output of each position of the input data 901 of the image segmentation unit 905, and the learning is executed such that each output is output as a center of the assigned cluster. In the case of the learning based on the mutual information, the mutual information between the image segmentation class assigned to the output of each position of the input data 901 of the image segmentation unit 905 and the corresponding position of the input data 901 is optimized to learn the assignment to the image segmentation class.

The image segmentation unit 905 may output a predetermined number of vectors. In this case, similarity with the predicted feature 904 or the vector, which is the output of the feature extraction unit 902 or the output of the feature prediction unit 903, is computed, and an assignment result to the vector having the highest similarity is handled as the image segmentation result 906.

A plurality of image segmentation results 906 may be output using a plurality of image segmentation units 905. In this case, a plurality of values may be output for the evaluation of the adaptability, or a high value may be selected from a plurality of evaluation values.

The image segmentation result 906 is used for the adaptability evaluation executed by the pretrained model adaptability evaluation unit 203. In the transfer learning executed by the transfer learning unit 206, the feature extraction unit 902 may be used alone, or the feature prediction unit 903 or the image segmentation unit 905 may be used in the pretrained model.

In step S705, the pretraining unit 603 checks whether an end condition of the learning defined by the pretraining condition 601 is satisfied. If the termination condition is satisfied, the processing proceeds to step S706. If the termination condition is not satisfied, the processing returns to step S704 to update the parameter of the pretrained model. Here, the end condition of the learning is, for example, whether the number of updates of the parameter reaches a predetermined number.

In step S706, the pretraining unit 603 stores, in the pretrained model storage unit 202, the pretrained model obtained by the pretraining in association with the pretraining condition 601 and the information related to the pretraining dataset acquired in step S702, and ends the flow of the pretraining.

Second Embodiment

Unlike the first embodiment, the machine learning system according to the second embodiment further includes a display and operation unit such that the operator executes the pretraining and the transfer learning more efficiently.

Figure 10:
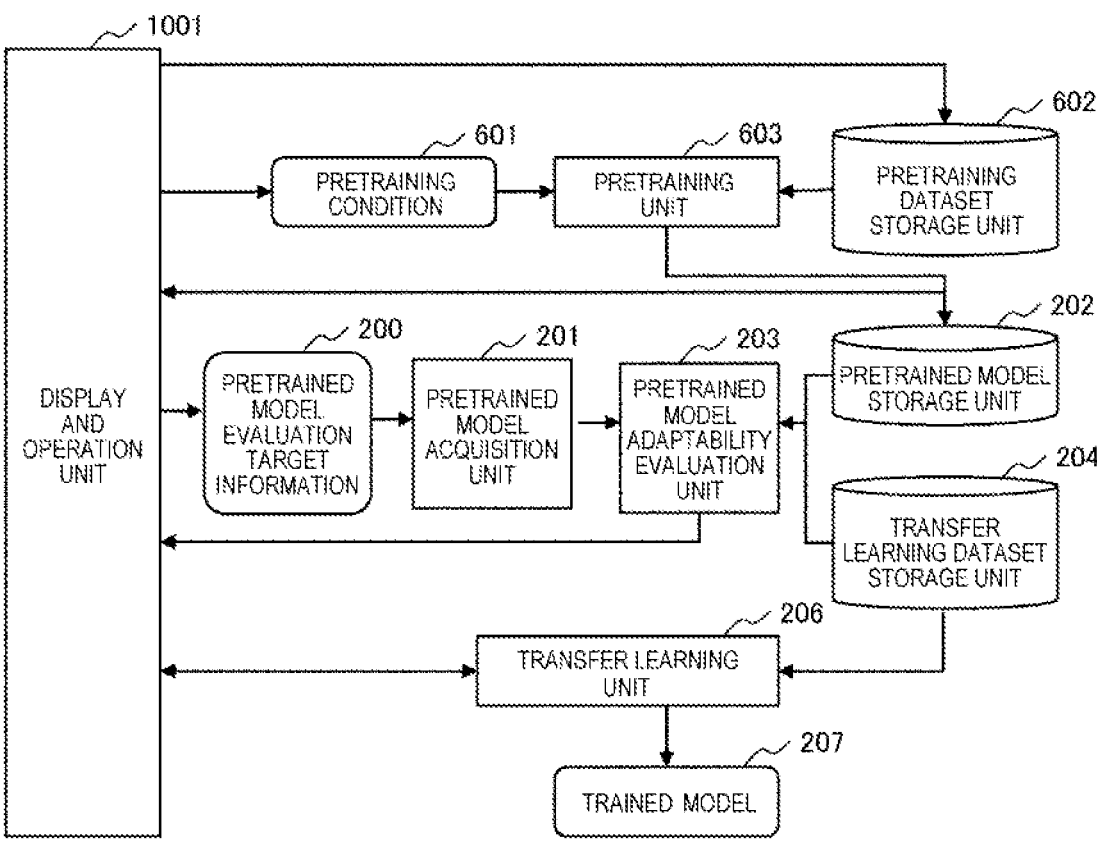
FIG. 10 is a diagram illustrating a configuration example of a machine learning system according to a second embodiment of the invention.

FIG. 10 is a diagram illustrating a configuration example of the machine learning system according to the second embodiment. As illustrated in FIG. 10, in the present embodiment, the operator can set the pretraining condition 601 for the pretraining unit 603 and set the pretrained model evaluation target information 200 for the pretrained model adaptability evaluation unit 203 using a display and operation unit 1001. The display and operation unit 1001 can also instruct the pretraining unit 603, the pretrained model adaptability evaluation unit 203, and the transfer learning unit 206 to start the pretraining, the adaptability evaluation, and the transfer learning, respectively.

FIG. 11 is an example of a pretraining setting screen. As illustrated in FIG. 11, the pretraining setting screen includes, for example, a pretraining parameter setting unit 1101, a dataset filter input unit 1102, a dataset selection unit 1103, and a training start unit 1104. On this screen, it is possible to set the pretraining condition 601 and to execute an operation related to start of the pretraining.

Here, the pretraining parameter setting unit 1101 sets a computation procedure and a hyperparameter used in the pretraining, and sets, for example, a network configuration of the neural network, a value related to the number of area classes segmented by the image segmentation unit 905, a value related to a dimension of a feature predicted by the feature prediction unit 903, a batch size and a learning schedule used in the pretraining, the number of parameter updates, and the like. The dataset filter input unit 1102 and the dataset selection unit 1103 use tag information 803 stored in the pretraining dataset storage unit 602 to select a dataset to be used in the pretraining. In the example in FIG.

11, a dataset including the tag information 803 corresponding to a domain or an imaging condition input by the dataset filter input unit 1102 is displayed on the dataset selection unit 1103. When the operator sets these parameter, selects a dataset to be used in the pretraining, and then operates the training start unit 1104, the pretraining unit 603 executes the pretraining.

FIG. 12 is an example of an adaptability evaluation and transfer learning setting screen. As illustrated in FIG. 12, the setting screen includes, for example, a transfer learning data selection unit 1201, a transfer learning dataset tag input unit 1202, a pretrained model display selection unit 1203, an adaptability evaluation start unit 1204, a transfer learning condition setting unit 1205, and a transfer learning start unit 1206.

Here, the transfer learning data selection unit 1201 selects a dataset of a downstream task to be used by the operator in the transfer learning. The transfer learning dataset tag input unit 1202 inputs tag information such as a domain and an imaging condition of the dataset selected by the operator using the transfer learning data selection unit 1201. The pretrained model display selection unit 1203 displays, for each pretrained model, information related to a pretraining condition and a dataset used in the pretraining, adaptability evaluated by the pretrained model adaptability evaluation unit 203, an evaluation index in the evaluation dataset 404 when the transfer learning unit 206 executes the transfer learning, and the like. The pretrained model display selection unit 1203 may search and extract a pretrained model having tag information corresponding to the information input by the transfer learning dataset tag input unit 1202 from the pretrained model storage unit 202 and display the pretrained model. The transfer learning condition setting unit 1205 sets a learning condition used in the transfer learning.

When the operator selects one or more pretrained models displayed on the pretrained model display selection unit 1203 and operates the adaptability evaluation start unit 1204, the pretrained model selected by the pretrained model display selection unit 1203 is transmitted to the pretrained model adaptability evaluation unit 203 as the pretrained model evaluation target information 200, and the pretrained model adaptability evaluation unit 203 executes the adaptability evaluation. The operator can efficiently select a model that is expected to have a good performance evaluation value at the time of the transfer learning by referring to an evaluation result of the adaptability displayed in the pretrained model display selection unit 1203.

On the other hand, when the operator operates the transfer learning start unit 1206, the pretrained model selected by the pretrained model display selection unit 1203 is transmitted to the transfer learning unit 206 as a model used in the transfer learning, and the transfer learning unit 206 executes the transfer learning and displays the evaluation result in the evaluation dataset 404 on the pretrained model display selection unit 1203.

FIG. 13 is an example of an adaptability evaluation result check screen. A screen can transition from the screen example in FIG. 12 to the screen example in FIG. 13, and the screen example in FIG. 13 includes, for example, a pretrained model display unit 1301, as dataset display unit 1302, an adaptability display unit 1303, a teaching information display unit 1304, and a pretrained model image segmentation result display unit 1305.

Here, the pretrained model display unit 1301 displays a pretrained model for which the operator wants to check the adaptability. The dataset display unit 1302 displays a dataset of a downstream task for which the operator wants to check the adaptability. The adaptability display unit 1303 displays the adaptability evaluated by the pretrained model displayed by the pretrained model display unit 1301 and the dataset displayed by the dataset display unit 1302. The teaching information display unit 1304 displays teaching information corresponding to input data included in the dataset displayed by the dataset display unit 1302. The pretrained model image segmentation result display unit 1305 displays a result of image segmentation of the pretrained model displayed in the pretrained model display unit 1301 with respect to the input data included in the dataset displayed in the dataset display unit 1302.

As described above, since the display and operation unit 1001 according to the present embodiment displays the teaching information of the dataset and the result of the image segmentation by the selected pretrained model together, it is easy for the operator to visually compare the teaching information and the result of the image segmentation. Therefore, it is possible to select a more appropriate pretrained model as compared with a case in which the pretrained model is selected based only on the adaptability. In the example of the adaptability evaluation result check screen illustrated in FIG. 13, the image segmentation results by the plurality of pretrained models may be displayed side by side at the same time, so that different pretrained models can be compared with each other. The teaching information related to the plurality of input data and the image segmentation results may be displayed side by side at the same time.

Third Embodiment

In a third embodiment, the machine learning system according to the first embodiment or the second embodiment described above is applied to image inspection.

In the case of image inspection, it is necessary to learn an inspection neural network for each inspection process. This is because an inspection target to be checked is different for each inspection process, and thus it is unrealistic to learn an inspection neural network that covers all the inspection targets, and when the inspection targets increase, the inspection neural network is flexibly expanded.

Therefore, in the case of the image inspection, the downstream task for executing the transfer learning is executed for each inspection process. In the case in which there are a plurality of inspection processes for the same product, since the features to be acquired by the neural network are often the same among the inspection processes, it is effective to use an image obtained in another inspection process in the transfer learning in such a case. However, when a task to be learned is different for each inspection process, that is, when segmentation is executed in a process and a detection task is executed in another process, it is difficult to learn a common neural network. In the present embodiment, by using self-supervised learning, it is possible to learn the common neural network by integrating the input data of each inspection process.

Therefore, in the present embodiment, datasets obtained for each product and each inspection process are stored in the pretraining dataset storage unit 602. The input data 802 according to the present embodiment is an inspection image obtained for each inspection process, and the tag information 803 according to the present embodiment is a product type, a type of the inspection process, an imaging condition of the inspection image, and the like.

When the operator wants to newly learn the inspection neural network, a dataset to be used in the pretraining is constructed by tag information such as a product type, an inspection process type, or an imaging condition that are expected to have a similar property related to the inspection process to be learned, and the pretraining is executed.

After that, the transfer learning is executed using the dataset of the inspection process to be learned, the trained model 207 is constructed, and the trained model 207 is used as a new inspection neural network after it is confirmed that a desired accuracy is achieved. Therefore, it is possible to efficiently form an inspection neural network suitable for each of various inspection processes.

The invention is not limited to the embodiments described above, and includes various modifications. For example, the above embodiments are described in detail in order to facilitate understanding of the invention, and the invention is not necessarily limited to those including all the configurations described above. A part of a configuration of one embodiment can be replaced with the configuration of another embodiment, and the configuration of another embodiment can be added to the configuration of one embodiment. A part of the configuration of each embodiment may be added to, deleted from, or replaced with another configuration.

What is claimed is:

1. A machine learning system comprising:
one or more processors; and
a non-transitory computer-readable memory storing instructions that, when executed by the one or more processors, cause the one or more processors to:
access, from a pretrained model repository, a plurality of pretrained models obtained by learning a transfer source task under respective conditions;
access a transfer learning dataset related to a transfer target task, the transfer learning dataset comprising input data and teaching information;
for each pretrained model of the plurality of pretrained models, evaluate an adaptability score of the pretrained model to the transfer learning dataset by:
forward propagating at least a portion of the input data through the pretrained model to obtain an image segmentation result that segments the input data into a plurality of areas such that a same area has a same meaning;
for each segmented area, obtaining a respective feature representation produced by the pretrained model for the segmented area;
determine a correspondence between segmented areas in the image segmentation result and classes indicated by the teaching information based at least in part on an overlap degree between (A) pixels of the segmented areas and (B) pixels associated with the teaching information; and
computing the adaptability score as a function representing a relation between the image segmentation result and the teaching information using at least one of: a probability density, an overlap degree of the segmented areas, and a similarity of the respective feature representations for the segmented areas;
select, based on the adaptability scores, a selected pretrained model from the plurality of pretrained models; and
execute transfer learning using the selected pretrained model and the transfer learning dataset to output a trained model.

2. The machine learning system according to claim 1, wherein each pretrained model comprises a neural network including:

a feature extraction subnetwork configured to extract a feature from the input data;

an image segmentation subnetwork configured to generate the image segmentation result; and a feature prediction subnetwork configured to output a different feature representation for each segmented area.

3. The machine learning system according to claim 2, wherein the adaptability score is computed between the image segmentation result generated for the input data of the transfer learning dataset and the teaching information of the transfer learning dataset.

4. The machine learning system according to claim 3, wherein the pretrained model is obtained by executing self-supervised learning on the transfer source task.

5. The machine learning system according to claim 3, further comprising:

a display device, wherein the instructions further cause the one or more processors to control the display device to display the image segmentation result and the teaching information together.

6. The machine learning system according to claim 3, wherein:

the adaptability score is computed by the function representing the relation between the image segmentation result and the teaching information; and the function uses at least one of the probability density, the overlap degree of the segmented areas, and the similarity of the respective feature representations for each segmented area.

7. The machine learning system according to claim 1, wherein the instructions further:

cause the one or more processors to select the selected pretrained model from the plurality of pretrained models stored in the pretrained model repository.

8. The machine learning system according to claim 7, further comprising-a display device, wherein the instructions further cause the one or more processors to control the display device to display the adaptability score for each pretrained model.

9. The machine learning system according to claim 1, wherein evaluating the adaptability score comprises forward propagating the input data of the transfer learning dataset through the pretrained model a number of times less than that at a time of executing the transfer learning.

10. The machine learning system according to claim 1, wherein:

the transfer learning dataset comprises an image obtained in an inspection process as the input data; and the pretrained model repository stores at least one pretrained model obtained by learning a task related to the inspection process.

11. The machine learning system according to claim 1, wherein determining the correspondence comprises performing an assignment between segmented areas and classes indicated by the teaching information by selecting, for each class indicated by the teaching information, a segmented area that maximizes an overlap degree with pixels associated with the class, and wherein the overlap degree comprises an intersection over union (IoU).

12. The machine learning system according to claim 1, wherein computing the adaptability score comprises, for each segmented area, computing a representative feature as an average of feature values output for pixels belonging to the segmented area, and computing the similarity of the respective feature representations based on distances between the representative features.

13. The machine learning system according to claim 1, wherein evaluating the adaptability score comprises forward propagating the input data through each pretrained model only one time per input image or at most ten times per input image.

14. The machine learning system according to claim 1, wherein evaluating the adaptability score comprises selecting the portion of the input data by random sampling from the transfer learning dataset.

15. A machine learning method comprising:

accessing a plurality of pretrained models obtained by learning a transfer source task under respective conditions;

accessing a transfer learning dataset related to a transfer target task, the transfer learning dataset comprising input data and teaching information;

for each pretrained model of the plurality of pretrained models, evaluating an adaptability score of the pretrained model to the transfer learning dataset by forward propagating at least a portion of the input data through the pretrained model to obtain an image segmentation result that segments the input data into a plurality of areas such that a same area has a same meaning;

for each segmented area, obtaining a respective feature representation produced by the pretrained model for the segmented area;

determining a correspondence between segmented areas in the image segmentation result and classes indicated by the teaching information based at least in part on an overlap degree between (A) pixels of the segmented areas and (B) pixels associated with the teaching information; and computing the adaptability score as a function representing a relation between the image segmentation result and the teaching information using at least one of a probability density, an overlap degree of the segmented areas, and a similarity of the respective feature representations for the segmented areas;

selecting, based on the adaptability scores, a selected pretrained model from the plurality of pretrained models; and executing, transfer learning using the selected pretrained model and the transfer learning dataset to output a trained model.

* * * * *